United States Patent
Apdalhaliem

(10) Patent No.: US 9,694,896 B1
(45) Date of Patent: Jul. 4, 2017

(54) AIRPLANE WINDOW HAVING INFRARED HEAT REFLECTION CAPABILITY

(71) Applicant: The Boeing Company, Chicago, IL (US)

(72) Inventor: Sahrudine Apdalhaliem, Seattle, WA (US)

(73) Assignee: The Boeing Company, Chicago, IL (US)

( * ) Notice: Subject to any disclaimer, the term of this patent is extended or adjusted under 35 U.S.C. 154(b) by 211 days.

(21) Appl. No.: 13/733,535

(22) Filed: Jan. 3, 2013

(51) Int. Cl.
*B64C 1/14* (2006.01)
*G02B 5/08* (2006.01)

(52) U.S. Cl.
CPC .......... *B64C 1/1484* (2013.01); *G02B 5/0808* (2013.01)

(58) Field of Classification Search
CPC ... B64C 1/1484; B64C 1/1476; B64C 1/1492; G02B 5/282; G02B 5/208; B60J 1/001; B60J 1/004; B60J 1/007; B60J 1/008; B60J 1/06
USPC ....... 244/121, 129.3; 359/359; 427/160, 161
See application file for complete search history.

(56) References Cited

U.S. PATENT DOCUMENTS

| | | | | |
|---|---|---|---|---|
| 2,356,878 A | * | 8/1944 | Painter | B60J 10/70 156/101 |
| 2,526,327 A | * | 10/1950 | Carlson | B32B 17/10761 219/203 |
| 2,784,926 A | * | 3/1957 | Bonza | B64C 1/1492 244/121 |
| 3,630,812 A | * | 12/1971 | Bruckner | B32B 17/10018 296/96.22 |
| 3,836,193 A | * | 9/1974 | Donahoe | B60J 1/2094 296/84.1 |
| 4,041,663 A | * | 8/1977 | Mazzoni | E06B 7/28 428/428 |
| 4,121,014 A | * | 10/1978 | Shaffer | 428/412 |
| 4,793,108 A | * | 12/1988 | Bain | B64C 1/1492 52/208 |

(Continued)

FOREIGN PATENT DOCUMENTS

| | | | | |
|---|---|---|---|---|
| DE | WO 2005005333 A2 | * | 1/2005 | ....... B32B 17/10009 |
| GB | 1598924 A | * | 9/1981 | ............... B05D 5/00 |

OTHER PUBLICATIONS

Audrey Fujimoto, PPG Aerospace NBAA display shows gold, silver solar-reflective window coatings, Oct. 20, 2009, PPG Industries.*

(Continued)

*Primary Examiner* — Tien Dinh
*Assistant Examiner* — Alexander V Giczy
(74) *Attorney, Agent, or Firm* — Kunzler Law Group, PC

(57) ABSTRACT

A window assembly particularly for use in a commercial airplane is provided. Many windows are provided on most commercial passenger airplanes. Solar radiation causes the passage of infrared heat radiation through each window assembly into the passenger cabin during daylight hours. The disclosure involves the window assemblies of airplanes and the use of a protective coating that is bonded to the outermost surface of an outermost window pane, with the outermost window pane bonded to an inner window pane of the airplane window assembly. The protective coating has a metallic element component that has the capability of reflecting an effective amount of infrared heat radiation from solar radiation away from passing through the window assembly and into the cabin of the airplane.

16 Claims, 3 Drawing Sheets

(56) References Cited

U.S. PATENT DOCUMENTS

| | | | | |
|---|---|---|---|---|
| 4,960,631 | A * | 10/1990 | Walters | B32B 17/10302 296/84.1 |
| 5,637,363 | A * | 6/1997 | Leray | B32B 17/10045 156/106 |
| 6,067,761 | A * | 5/2000 | Demeester | B64C 1/1492 428/192 |
| 6,280,826 | B1 * | 8/2001 | Woll | B32B 17/10045 109/49.5 |
| 6,530,184 | B1 * | 3/2003 | Emek | E06B 3/308 52/204.591 |
| 8,380,393 | B1 * | 2/2013 | Ohtomo | B64C 1/1484 250/221 |
| 2003/0049462 | A1 * | 3/2003 | Oguri et al. | 428/429 |
| 2004/0021334 | A1 * | 2/2004 | Blevins | B32B 17/10036 296/84.1 |
| 2004/0238690 | A1 * | 12/2004 | Wood | B64C 1/1492 244/129.3 |
| 2005/0200934 | A1 * | 9/2005 | Callahan | B64C 1/1484 359/265 |
| 2007/0002433 | A1 * | 1/2007 | Chen | F21V 9/04 359/359 |
| 2007/0095984 | A1 * | 5/2007 | Wood | 244/129.3 |
| 2008/0048101 | A1 * | 2/2008 | Romig | B60J 3/04 250/221 |
| 2008/0230653 | A1 * | 9/2008 | Mitchell | B60J 3/04 244/129.3 |
| 2008/0308677 | A1 * | 12/2008 | Kirchoff | B64C 1/1492 244/129.3 |
| 2010/0123043 | A1 * | 5/2010 | Neple | B32B 17/10009 244/129.3 |
| 2010/0127126 | A1 * | 5/2010 | Lieven | B64C 1/1492 244/129.3 |
| 2010/0315693 | A1 * | 12/2010 | Lam | G02B 5/23 359/241 |
| 2011/0308693 | A1 * | 12/2011 | Van Nutt | B32B 17/1022 156/60 |
| 2012/0320621 | A1 * | 12/2012 | Kleo | B32B 17/10018 362/558 |
| 2013/0000232 | A1 * | 1/2013 | Weiss | B32B 17/10055 52/204.6 |
| 2013/0062468 | A1 * | 3/2013 | Yokoi | B64C 1/1492 244/129.3 |

OTHER PUBLICATIONS

The Engineer, "Taking the Heat", Jun. 12, 2009. http://www.theengineer.co.uk/news/taking-the-heat/311738.article, accessed on Aug. 28, 2015.*

Walter Shawlee, "System Design: How to Keep the Cockpit Cool," Aviation Today, Oct. 1, 2003. http://www.aviationtoday.com/av/military/System-Design-How-to-Keep-the-Cockpit-Cool__1124.html#.VeDMRE2FNmM, accessed on Aug. 28, 2015.*

G. Daniel Brewer, "Hydrogen Aircraft Technology", CRC Press, Jun. 4, 1991, p. 354. Accessed via Google Books, https://books.google.com/books/about/Hydrogen__Aircraft__Technology.html?id=hf-iyU2R7eIC, on Aug. 28, 2015.*

CSOBeech, "Static Cling Window Tint", http://csobeech.com/windowtint.html. Archived by Internet Archive on Nov. 22, 2010, http://web.archive.org/web/20101122083147/http://csobeech.com/windowtint.html, accessed Aug. 28, 2015.*

PPG Aerospace NBAA display shows gold, silver solar-reflective window coatings. http://www.ppg.com/en/newsroom/news/Pages/20091020C.aspx (Nov. 5, 2012).

* cited by examiner

AIRPLANE WINDOW HAVING INFRARED HEAT REFLECTION CAPABILITY

CROSS-REFERENCE TO RELATED APPLICATIONS/INCORPORATION BY REFERENCE

Not Applicable

FEDERALLY SPONSORED RESEARCH OR DEVELOPMENT

Not Applicable

MICROFICHE/COPYRIGHT REFERENCE

Not Applicable

FIELD

Certain embodiments of the disclosure relate generally to airplane window assemblies wherein the windows are provided with a relatively high degree of reduction of infrared heat radiation that pass through each window assembly. More specifically, certain embodiments of the disclosure relate to the provision of a coating on a transparent window pane in order to effectively reduce the amount of infrared heat radiation being passed into the cabin from solar radiation, thereby assisting in maintaining the desired level of ambient conditions for passengers and crew within the cabin of the airplane, and improving durability of the aircraft window system.

BACKGROUND

In the airplane industry, it is well known that the maintenance of a level of comfort in the cabin for the passengers and crew is important and necessary. The maintenance of desired ambient conditions includes interior cabin pressure, relative humidity and temperature. This comfort level is true in all types of airplanes including private airplanes and military airplanes. In airplane cabins of large commercial airplanes, comfort level is particularly important since modern commercial airplanes have passenger loads in the hundreds.

In the case of a large commercial airplane, the airplane flies at tens of thousands of feet above sea level and well above the clouds. During daytime, these commercial airplanes, with multiple windows, encounter hours of solar radiation. Because of the many windows, it is extremely important to protect the interior from the potentially excessive levels of infrared heat radiation in the cabin resulting from the solar radiation. In this regard, it is also important to avoid excessive heating of the internal cabin because this places a burden on the air conditioning system which thereby places a burden on fuel efficiency in order to maintain the cabin temperature at a suitable comfort level. In addition, the excessive heating could raise the temperature of parts of the window assembly well above their allowable limits.

One of the principal ways to reduce the amount of heat radiation caused by the transmission of infrared heat from solar radiation is to provide a suitable design for the windows. Specifically, it is important to reduce the amount of infrared heat radiation from entering the cabin through the many passenger windows provided in a commercial jet airplane.

Present airplane window designs involve a "stack" of transparent components including, for example, an outer pane, an inner pane, for some airplane models, an interlayer or a bonding layer between the two panes, and an innermost dust cover for the cabin interior. In some cases, in modern aircraft, there is a substantially transparent panel of an electronic dimmer window (EDW). EDW is a device to control light transmission into the cabin via electronic apparatus. In addition, in some modern airplane windows, a solar reflective coating, containing particles of metallic pigments, has been applied on the inboard surface of the inner pane of the window assembly. Such coatings are available from both PPG Industries and GKN Industries. Such coatings are available with both silver and gold particles. Although such gold containing coatings have been effectively used, still further effective reduction in the amount of infrared heat from solar radiation passing through the windows into the cabin is considered to be highly desirable. It would be highly desirable to further reduce solar heat transmission so as to maintain the comfort level in the cabin for the passengers, but it would also, importantly, increase fuel efficiency and durability of the window system. Any such increase in fuel efficiency in an airplane is clearly highly beneficial. The window assembly to be described herein fulfills such a need.

Further limitations and disadvantages of conventional and traditional approaches will become apparent to one of skill in the art, through comparison of such approaches with the present disclosure as set forth in the remainder of the present application including the drawings.

BRIEF SUMMARY

One aspect of an improvement in the construction of an airplane window assembly is provided. An airplane window assembly is to be attached to the fuselage of an airplane. A protective coating is bonded to the outer surface of the outermost window pane. The protective coating includes a metallic element component, such as gold or silver, having the capability of reflecting infrared heat radiation emanating from solar radiation by reducing the passage of excessive amounts of heat radiation through the window assembly. In a preferred aspect, the metallic coating includes silver particles.

In another aspect of the construction of window assembly, a window assembly is to be attached to an enclosed structure. An outer window pane has an outer surface facing the atmosphere. A protective coating is bonded to the outer pane of the outer window pane. The protective coating includes a metallic element component for reflecting an effective amount of infrared heat radiation caused by solar radiation away from passing through the window assembly for maintaining desired ambient conditions within the interior of the structure.

In a still further aspect of the present disclosure, an airplane is provided with multiple window assemblies with each of the window assemblies having outer window panes and inner window panes bonded to the outer window panes. Each of the outer window panes has an outer surface. Each of the window assemblies includes multiple clear panes spaced inwardly from the inner and outer window panes and have air spaces formed between the panes. An inner pane is provided to face the interior of the cabin. A protective coating is bonded on the outer surface of each of the outer window panes. The protective coating has a metallic element component having the capability of reflecting an effective amount of infrared heat radiation resulting from solar radiation away from passing through the multiple panes.

In another aspect of the disclosure, a method is provided for reducing the amount of infrared heat radiation resulting from solar radiation from entering the interior of the airplane cabin. An airplane fuselage is provided surrounding the cabin. At least one window assembly is attached to the fuselage. An outermost window pane is provided on the window assembly. An outermost exterior surface is provided on the outermost window pane. A protective coating material is provided having a metallic element component, namely, gold and silver or silver particles, with the capability of reflecting an effective amount of infrared heat radiation resulting from solar radiation away from passing through the window assembly for contributing to the maintaining of a desired ambient temperature level within the cabin of the airplane. The protective coating is bonded to the outermost exterior surface of the outermost window pane.

The features, functions, and advantages that have been discussed can be achieved independently in various embodiments or may be combined in yet other embodiments, further details of which can be seen with reference to the following description and drawings.

DETAILED DESCRIPTION

The following description and the accompanying drawings set out the details of the window assembly to be described. The description, as follows, is not to be considered in a limiting sense, but is provided for the purpose of illustrating general principles of the claims and described window assembly. The scope of the disclosure will be defined by the claims that follow this detailed description.

Although the description of the window assembly will specifically be described with reference to use in a commercial airplane environment, it is to be understood that the described window assembly improvements may be used in any type of environment wherein solar energy causes undue heating of the interior of an enclosed space, such as an automobile, or a land building with windows, particularly in geographical areas where solar radiation is a concern in heating the interior of a building to undesired temperature levels.

Commercial airplanes have multiple windows and assist in maintaining desired ambient conditions within the cabin of the airplane. Airplanes all have a fuselage with many passenger window assemblies attached to the fuselage. The window assemblies of the present design assist in reducing the transfer of infrared heat radiation into the cabin through the windows caused by solar radiation, particularly during daytime operating conditions. It is always important to maintain the cabin at comfortable ambient conditions for the passengers and the crew alike. It is known that coatings are commercially available that contain a metallic element component, such as gold or silver, wherein such coatings are capable of reflecting unwanted infrared heat from entering the airplane cabin caused by solar radiation. Specifically, a coating composition with gold particles as a component has been provided for window assemblies used in some airplanes, wherein the coating is placed on the inner window pane on the inner or inboard surface in order to reflect heat radiation back outwardly to the atmosphere. It has now been found that a significant improvement in reflectability is provided by constructing the window assembly in a different manner, to be described hereinafter.

Figure 1:
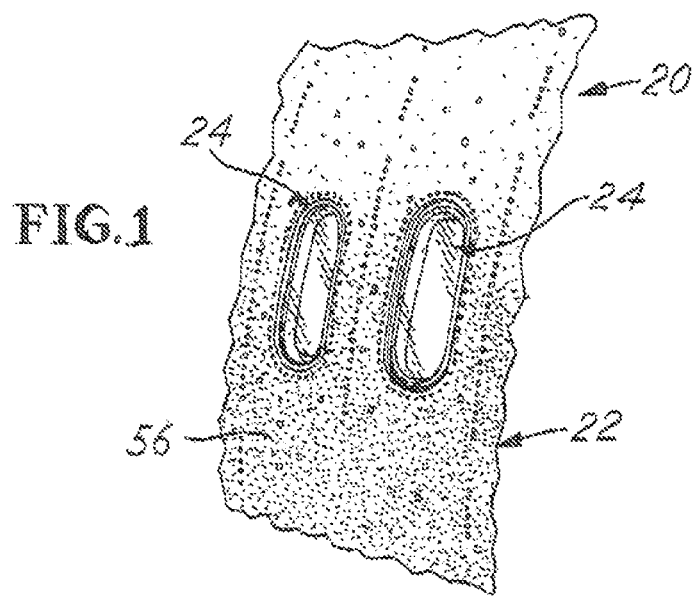
FIG. 1 is a broken view of a section of the fuselage of an airplane having two window assemblies, to be described herein, secured to the fuselage of the airplane.

Referring to FIG. 1, there is shown a portion of an airplane, generally 20, having a fuselage 22, with two window assemblies 24, attached to a fuselage 22. The fuselage 22 and all the window assemblies 24 enclose and isolate the interior passenger cabin (not shown) from the exterior surrounding atmosphere of the airplane 20. The passenger cabin is maintained at a desired passenger comfort level by a complex electro-mechanical air conditioning (AC) system. The fuselage 22 and window assemblies 24 cooperate to isolate the passenger cabin interior from the outer atmosphere. The fuselage 22, the window assemblies 24 and the onboard electro-mechanical AC system cooperate to maintain the cabin at the desired comfort level. The window assemblies 24 specifically contribute to the desired comfort level by reducing the amount of solar heat radiation entering the cabin and, in some airplanes, an electronic dimmable window pane 37 is controlling the sunlight transmitting into the cabin. The window assemblies 24 of the present disclosure assist in maintaining the cabin at the desired ambient comfort conditions, particularly, at a temperature range within the cabin thereby also assisting in improving fuel efficiency by reducing air conditioning levels.

Figure 2:
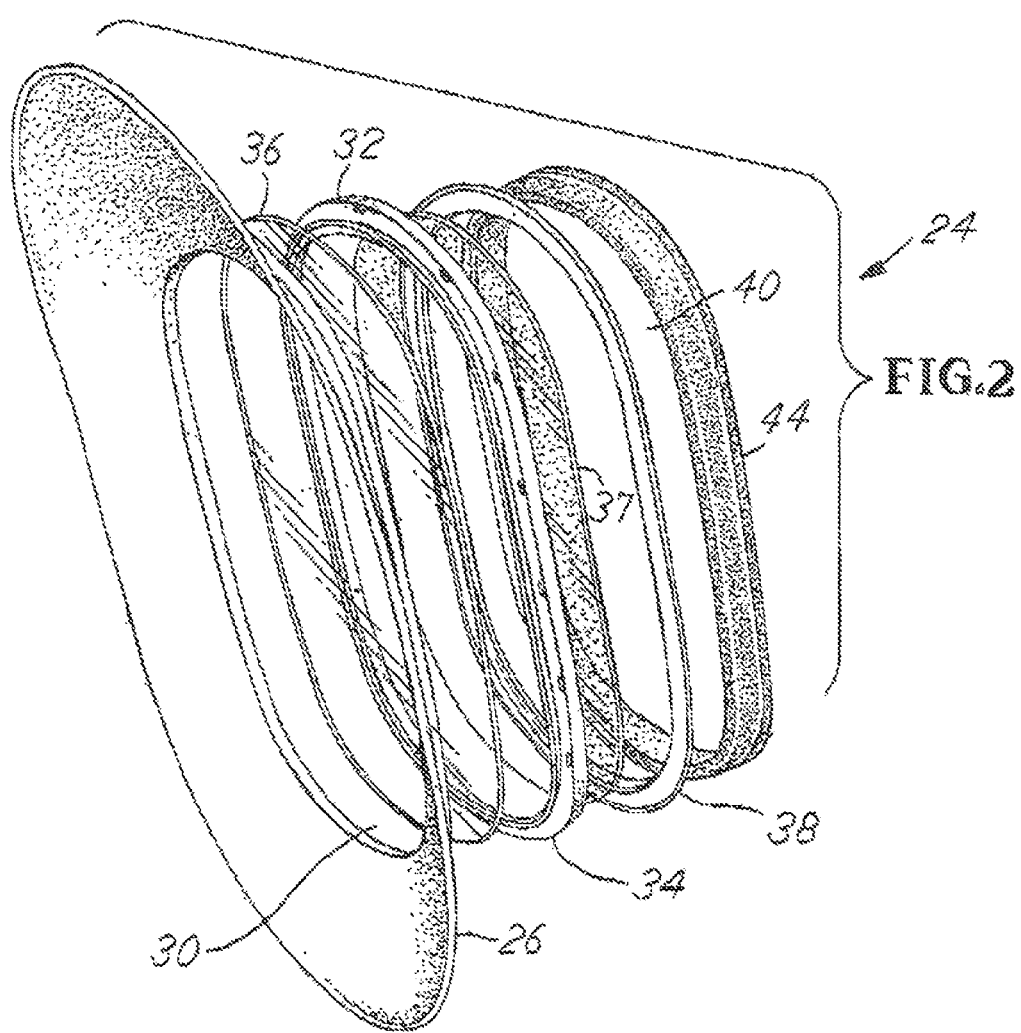
FIG. 2 is an exploded view of one of the window assemblies shown in FIG. 1.
Figure 3:
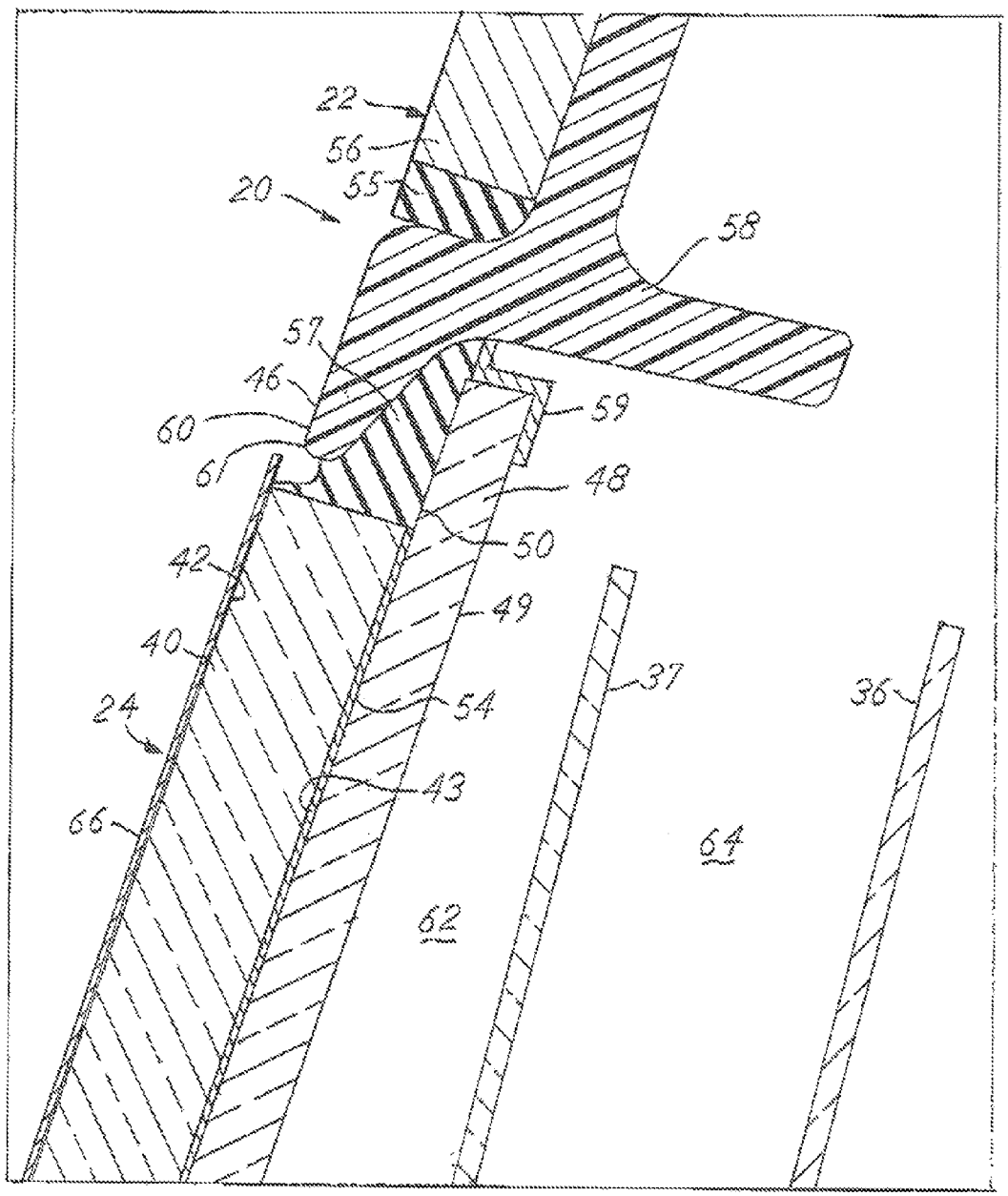
FIG. 3 is a detailed vertical cross sectional view through the window assembly of FIG. 1 and FIG. 2 showing a portion of the window assembly of FIGS. 1 and 2 secured to the fuselage of the airplane.

Referring to FIG. 2, there is shown an exploded view of a window assembly 24 of the type shown in FIG. 1 having stacked transparent parts. An upright, generally oval shaped inner reveal 26 is secured in a conventional manner to the interior wall panel (not shown) within the interior of the passenger cabin. The inner reveal includes a continuous inner edge portion 30. A mid reveal, generally 32, has an outer edge portion 34 which is received by the inner edge 30 of the inner reveal 26. An innermost transparent or translucent dust cover pane 36 is secured in place between the inner reveal 30 and the mid reveal 32. In the embodiment shown in FIG. 2, there is shown a translucent or transparent electronic dimmer window pane 37 which is used in some aircraft. The electronic dimmer window pane 37 has electronic controls (not shown). The electronic dimmer window pane 37 is secured in place by the mid reveal 32 by cooperation between an outer reveal 38 and the mid reveal 32. A transparent or translucent outer window pane 40 forms the outermost pane used in the described window assembly 24. The outer window pane 40 will be hereinafter described in greater detail and includes an outer surface 42, as seen in FIG. 3. A bellow seal, generally, 44, is secured at its outer peripheral portion 46 to the exterior surface 56 of the fuselage as shown in FIG. 1. The outer window pane 40 is secured in place on the bellow seal 44 in a cooperative relationship with the outer reveal 38.

Although one type of window assembly 24 is shown and described herein, other types of window assemblies may be utilized and would benefit from the improved window assembly described and claimed herein.

Referring now to FIG. 3, the window assembly 24 shown in FIG. 2 is shown in greater detail. FIG. 3 is an upright, more detailed, central cross section through the window assembly 24. For purposes of simplicity, the inner reveal 26, the mid reveal 32, the outer reveal 38, and the bellow seal 44 are not shown in FIG. 3. FIG. 2 does not show that the outer window pane 40 has a transparent or translucent inner window pane 48 bonded to it, as seen in FIG. 3. Both the inner window pane 48 and the outer window pane 40 are made of an acrylic material. The inner window pane 48 has an outer surface 50 that is bonded to the inner surface 43 of the outer window pane 40. As shown, there is a bonding layer or interlayer 54 which bonds the outer window pane 40 to the inner window pane 48 by securing or pressing the inner surface 43 thereof against the outer surface 50 of the inner pane 48.

As described above and as shown in FIG. 3, the fuselage 22 has a skin or exterior portion 56 thereof. Furthermore, referring to FIG. 3, a frame 58 is bonded by a seal 55 to the skin 56 of the fuselage 22. The frame 58 of the airplane 20 has an exterior unitary flange 60 that surrounds the window assembly 24 and defines an opening 61 in the fuselage 22 for secure attachment of the window assembly 24 therein. A sealing material 57 is applied completely between and around both the opening 61 in the fuselage 22 and the outer peripheries of both the outer window pane 40 and the inner window pane 48. A seal 59 is also provided and surrounds the inner window pane 48 and seals the inner window pane 48 to the sealing material 57 in place within the opening 61 defined in the fuselage 22 of the airplane 20. The sealing material 57 is sealably secured to the frame 58 and the outer window pane 40 and inner window pane 48. The seal 59 also seals the inner window pane 48 to the sealing material 57. The bellow seal 44 is not shown in FIG. 3, but it is also secured to the frame 58, the sealing material 57 and the outer window pane 48.

As indicated above, FIG. 3 is a cross sectional view that shows the window assembly 24 without the inner reveal 26, the mid reveal 32, the outer reveal 38 or the bellow seal 44. This is done for purposes of simplicity in this description. FIG. 3 does also show spacing between the inner surface 49 of the inner window pane 48 and the electronic dimmer window pane 37 to provide an air space 62 therebetween to provide heat insulation. In addition, the inner side of the electronic dimmer window pane 37 is spaced from the dust cover 36 by the inner reveal 26 and mid reveal 32 to define a second heat insulating air space 64 therebetween.

In actual practice in certain modern aircraft, a heat reflective coating has been applied to the inner surface 49 of the inner pane 48. The coating that has been used is available from GKN Industries and PPG Industries and the reflective coating contained gold particles. Although this reflective coating material has been acceptable, it is desired that a greater amount of reflection of the heat radiation from the solar radiation be provided to even further reduce the amount of heat radiation penetrating the cabin of the airplane.

Figure 4:
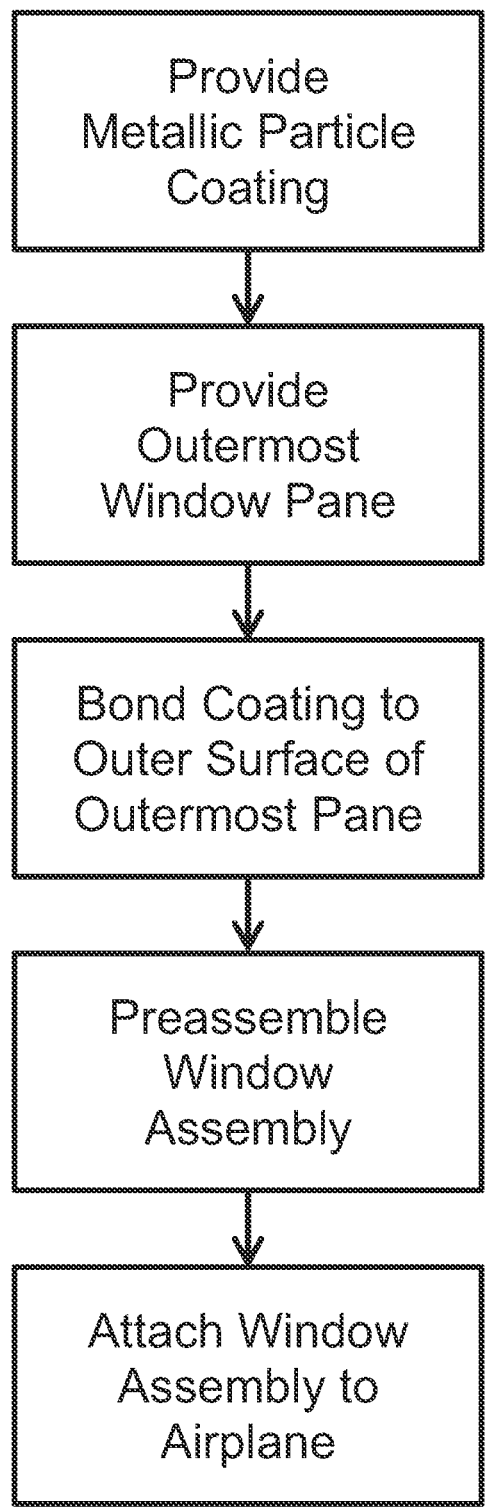
FIG. 4 is a flow diagram illustrating the steps used to perform the method of making the window assemblies of FIGS. 1-3.

Referring to FIG. 4, a method is provided for manufacturing the window assembly 24. It is preferred that the window assembly 24 first be preassembled as a unit. Initially, the coating 66 containing metallic particles is bonded on the outer surface 42 of the outermost window pane 40. The coated outermost window 40 is installed as part of the preassembled of the window assembly 24. The preassembled window assembly 24 is in condition for attachment to the fuselage 22 of the airplane 20. Commonly multiple window assemblies are attached to the fuselage.

It has been determined, following testing substantially under atmospheric conditions, that reflection of the solar radiation is significantly improved by the disclosure. Although the effectiveness of the gold particle coating on the inner face 49 of the inner window pane 48 has been suitable, it has been surprisingly found that by applying a reflective coating 66 containing reflective metallic particles, such as available from PPG Industries and GKN Industries, to the outer surface 42 of the outer window pane 40, that significant improvement in reduced infrared heat transmission into the cabin has been accomplished. In addition, it was further surprisingly found that the use of silver particles in the coating 66 on the outer pane 40 provided further significant improvement over the use of a gold particle containing coating on the outer surface 42 of the outer window pane 40.

Temperature tests were conducted at a location in Phoenix, Ariz. from September 2-16. The test article comprised two window assemblies 24 attached to a skin 56 having a contour like a fuselage. Test results show that as high as 60% reflection of heat radiation was accomplished by using the coating 66 on the outer surface 42 of the outer pane 40 with silver particles. In contrast, a coating containing a coating 66 containing gold on the outer surface 42 of the outer pane 40 had only about 40% reflection of the heat radiation. The tests of the effectiveness of the application of a coating 66 containing silver particles on the outer surface 42 of the outer window pane 40 resulted in the following conclusion: The combination of the coating 66 containing silver particles on the outer surface 42 of the outer window pane 40 provided a higher reflection of heat radiation than the use of a coating 66 containing gold particles on the outer surface 42 of the outer window pane 40.

While the disclosure has been described with reference to certain embodiments, it will be understood by those skilled in the art that various changes may be made and equivalents may be substituted without departing from the spirit and scope of the present disclosure. In addition, many modifications may be made to adapt a particular situation or material to the teachings of the present disclosure without departing from its scope. Therefore, it is intended that the present disclosure is not to be limited to the particular embodiments disclosed, but that the present disclosure will include all embodiments falling within the scope of the appended claims.

What is claimed is:

1. An airplane having an interior cabin maintained at desired ambient conditions, including a desired temperature level within said cabin, said airplane comprising:
   a fuselage;
   at least one window assembly secured to said fuselage for assisting in maintaining said desired ambient conditions including said temperature level, wherein the window assembly comprises a frame;
   an inner window pane on said window assembly;
   an outermost window pane on said window assembly having an outer surface, wherein the inner window pane and the outermost window pane are bonded together, wherein the inner window pane is bonded immediately adjacent to the outermost window pane, and wherein the outermost window pane is thicker than the inner window pane;
   a seal directly engaged to a peripheral edge and an inner surface of the inner window pane that seals the inner window pane to the frame of the window assembly, wherein the seal is free from direct contact with the outermost window pane and free from direct contact with an outer surface of the inner window pane; and a protective reflective coating bonded to said outer surface of said outermost window pane, said protective reflective coating having a metallic element component with a capability of reflecting an effective amount of infrared heat radiation resulting from solar radiation away from passing through said window assembly for contributing to maintaining said desired temperature levels within said cabin of said airplane.

2. The window assembly of claim 1 wherein said metallic element of said protective coating comprises silver particles.

3. The window assembly of claim 1 wherein said metallic element of said protective coating comprises gold particles.

4. The window assembly of claim 1 wherein the inner window pane and the outermost window pane are bonded together with a bonding interlayer, wherein the bonding interlayer bonds an outer surface of the inner window pane to an inner surface of the outermost window pane, wherein the bonding interlayer only partially covers the outer surface of the inner window pane.

5. An enclosed structure having an interior maintained at desired ambient conditions wherein said structure has at least one window assembly, wherein said window assembly comprises:

a frame;

an inner window pane;

an outer window pane having an outer surface on said outer window pane facing an outer atmosphere, wherein the inner window pane and the outer window pane are bonded together, wherein the inner window pane is bonded immediately adjacent to the outer window pane, and wherein the outermost window pane is thicker than the inner window pane;

a seal directly engaged with a peripheral edge and an inner surface of the inner window pane that seals the inner window pane to the frame, wherein the seal is free from direct contact with the outer window pane and free from direct contact with an outer surface of the inner window pane; and a protective coating bonded to said outer surface of said outer window pane;

said protective coating having a metallic element component for reflecting an effective amount of infrared heat radiation caused by solar radiation away from passing through said window assembly for contributing to the maintaining of said desired ambient conditions within said interior of said structure;

wherein the inner window pane and the outer window pane are bonded together with a bonding interlayer, wherein the bonding interlayer bonds an outer surface of the inner window pane to an inner surface of the outer window pane, wherein the bonding interlayer only partially covers the outer surface of the inner window pane.

6. The enclosed structure of claim 5 wherein said metallic element component comprises silver particles.

7. An airplane having an interior cabin maintained at desired ambient conditions, including a desired temperature level within said cabin, wherein said airplane includes a fuselage and multiple window assemblies, each of said window assemblies comprising:

a frame;

an outer window pane and an inner window pane, constructed as a single-layer window pane, bonded to said outer window pane, wherein said outer window pane has an outer surface, wherein the inner window pane is bonded immediately adjacent to the outer window pane, and wherein the outermost window pane is thicker than the inner window pane;

a seal directly engaged to a peripheral edge and an inner surface of the inner window pane that seals the inner window pane to the frame of the window assembly, wherein the seal is free from direct contact with the outer window pane and free from direct contact with an outer surface of the inner window pane; and multiple clear panes spaced inwardly from said inner and outer window pane and having air spaces formed between said multiple clear panes, wherein one of the multiple clear panes is an electronic dimmer window pane, wherein a first air space is interposed between the inner window pane and the electronic dimmer window pane, and wherein a second air space is interposed between the electronic dimmer window pane and another of the multiple clear panes; and a protective coating bonded on said outer surface of said outer window pane;

said protective coating having a metallic element component having the capability of reflecting an effective amount of infrared heat radiation resulting from solar radiation away from passing through said multiple clear panes for contributing to the maintaining of the desired ambient conditions including temperature within said cabin of said airplane.

8. The airplane of claim 7 wherein said metallic element of said protective coating comprises silver particles.

9. The airplane of claim 7 wherein the inner window pane and the outer window pane are bonded together with a bonding interlayer, wherein the bonding interlayer bonds an outer surface of the inner window pane to an inner surface of the outer window pane, wherein the bonding interlayer only partially covers the outer surface of the inner window pane.

10. A method for making a window assembly for reducing infrared heat radiation resulting from solar radiation from entering an interior of an airplane, said method comprising the steps of:

providing at least one said window assembly, wherein the window assembly comprises a frame;

providing an inner window pane of the window assembly;

providing an outermost window pane of the window assembly, wherein the inner window pane and the outermost window pane are bonded together, wherein the inner window pane is bonded immediately adjacent to the outermost window pane, wherein the inner window pane and the outermost window pane are bonded together with a bonding interlayer, wherein the bonding interlayer bonds an outer surface of the inner window pane to an inner surface of the outermost window pane, wherein the bonding interlayer only partially covers the outer surface of the inner window pane, and wherein the outermost window pane is thicker than the inner window pane;

providing a seal of the window assembly, wherein the seal is directly engaged with a peripheral edge and an inner surface of the inner window pane that seals the inner window pane to the frame of the window assembly, wherein the seal is free from direct contact with the outermost window pane and free from direct contact with an outer surface of the inner window pane;

providing a protective coating having a metallic element component with a capability of reflecting an effective amount of the infrared heat radiation resulting from solar radiation away from passing through said window assembly for contributing to maintaining a desired temperature level within the interior of the airplane; and bonding the protective coating to an outer surface of said outermost window pane for reflecting said effective amount of infrared heat radiation resulting from solar radiation away from passing through said window assembly for contributing to maintaining said desired temperature level within the interior of the airplane.

11. The method of claim 10 wherein providing the protective coating comprises providing silver particles in the protective coating.

12. The method of claim 10 wherein providing the protective coating comprises providing gold particles in the protective coating.

13. The method of claim 10 wherein said bonding of said protective coating to said outer surface of said outermost window pane is applied before said window assembly is attached to said airplane.

14. The method of claim 10 including the step of providing multiple window assemblies for attachment to said airplane.

15. The method of claim 10 including the step of attaching said at least one window assembly to said airplane.

16. The method of claim 14 further including the step of attaching said multiple window assemblies to said airplane.

\* \* \* \* \*